United States Patent [19]
Venuto et al.

[11] Patent Number: 5,762,397
[45] Date of Patent: Jun. 9, 1998

[54] WIRE ATTACHMENT TO A SEAT FRAME

[76] Inventors: Dennis Venuto, 22543 Shorewood St., St. Clair Shores, Mich. 48081; Ranko Krstovic, 2772 Colony Rd., Ann Arbor, Mich. 48104; Gary Reynolds, 43166 Lochrisen Ct. Apt 3311, Novi, Mich. 48375

[21] Appl. No.: 822,797

[22] Filed: Mar. 24, 1997

[51] Int. Cl.6 .................. A47C 3/025; A47C 7/02
[52] U.S. Cl. .................. 297/284.4; 297/452.52; 297/452.2
[58] Field of Search .................. 297/284.1, 284.4, 297/284.5, 284.2, 452.3, 452.52, 452.2, 452.18; 403/326, 329; 24/297, 115 G, 324, 265 C

[56] References Cited

U.S. PATENT DOCUMENTS

| | | | |
|---|---|---|---|
| 3,246,375 | 4/1966 | Landwer | 24/297 |
| 4,159,847 | 7/1979 | Arai | 397/284.4 |
| 4,556,251 | 12/1985 | Takagi | 297/284.4 |
| 4,602,760 | 7/1986 | Tiefenbach et al. | 24/297 X |
| 4,724,584 | 2/1988 | Kasai | 24/115 G |
| 4,728,068 | 3/1988 | Rivkin | 24/297 X |
| 5,007,677 | 4/1991 | Ozawa et al. | 297/284.4 |
| 5,217,278 | 6/1993 | Harrison et al. | |
| 5,228,816 | 7/1993 | Boville | 24/297 X |
| 5,286,087 | 2/1994 | Elton | |
| 5,626,390 | 5/1997 | Schuster et al. | 297/284.4 X |

FOREIGN PATENT DOCUMENTS

| | | | |
|---|---|---|---|
| 1274003 | 7/1968 | Germany | |
| 3407666 | 10/1984 | Germany | |
| 821902 | 10/1959 | United Kingdom | 24/297 |
| 9407393 | 4/1994 | WIPO | |

*Primary Examiner*—Milton Nelson, Jr.
*Attorney, Agent, or Firm*—Harness, Dickey & Pierce, P.L.C

[57] ABSTRACT

A wire attachment for a seat frame in which a clip having a bore for receiving a wire therethrough and a frame mounting portion is utilized to attach the wire to the frame. The mounting portion of the clip includes a pair of legs having reversed legs forming barbs which are inserted into an aperture into the seat frame with the barbs engaging the reverse or opposite surface of the frame from the wire. A wire is arranged with a bend adjacent to at least one clip to prevent longitudinal movement of the wire relative to the clip.

20 Claims, 3 Drawing Sheets

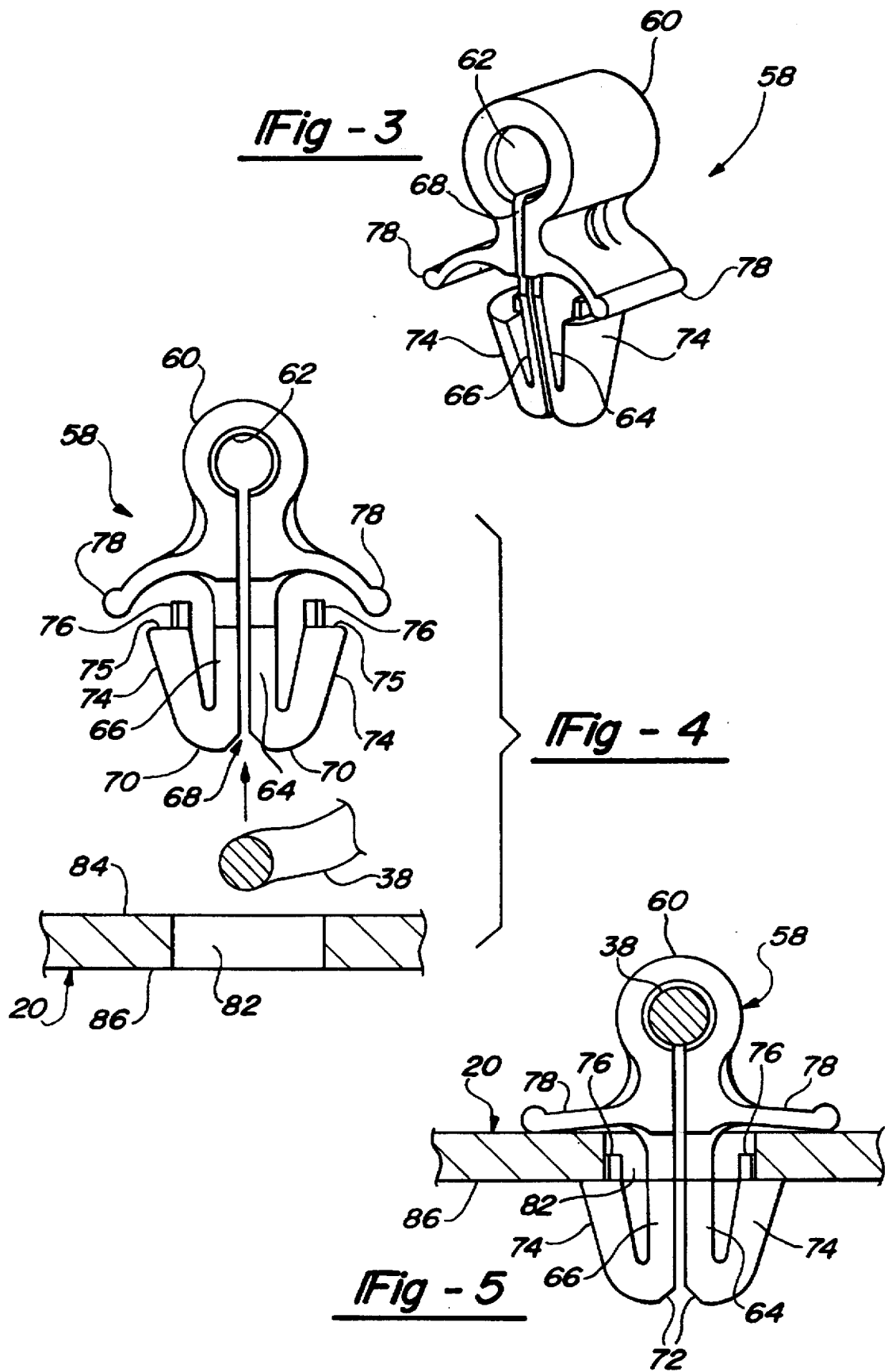

WIRE ATTACHMENT TO A SEAT FRAME

BACKGROUND AND SUMMARY OF THE INVENTION

The present invention relates generally to vehicle seat assemblies and in particular to a wire attachment to the seat frame.

Vehicle seat assemblies typically include a lower seat frame and a seat back frame. A seat back frame is often constructed of tubular, stamped or case metal and includes a pair of upright members and an upper cross member and often times a lower cross member, forming a generally rectangular shaped frame structure. Various structures may be attached to the seat back frame such as an adjustable lumbar support mechanism that is disposed between the upright members and between the cross members. Other structures may include wires that support a resilient pad intermediate the frame members. The support wires are typically attached to the seat back frame by welding. At least one type of adjustable lumbar support mechanism is mounted on support wires that extend vertically or horizontally between frame members.

One difficulty with welding support wires to the frame is that over time, the welds may fail due to metal fatigue. A loose wire can result in noise as well as in a loss of support. Accordingly, it is an object of the present invention to provide an attachment of support wires to a seat frame that avoids the use of welds.

The present invention utilizes a clip to secure the wire to the seat back frame. The clip includes a wire mounting portion having a bore in which a portion of the support wire is retained. The clip further includes a pair of legs extending generally radially relative to the bore of the wire mounting portion. The clip is attached to the frame by inserting the legs of the attaching portion into an aperture in the seat frame. The legs include a reverse bend portion which is bent back toward the opposite surface of the forming barbs which and engage the opposite surface of the frame to hold the clip in place. A biasing portion engages the first surface of the seat frame and draws the barbs into firm engagement with the opposite side to hold the clip tightly in place. Retaining tabs are provided at the distal ends of the clip barbs which are positioned within the aperture in the frame member. These tabs prevent subsequent spreading of the barbs in response to a load on the clip acting to pull the clip out of the frame member aperture.

The support wires and clips are assembled to the frame by first placing the clips on the support wire. This is accomplished by pressing the two legs of the clip against the wire, causing the legs to separate from one another allowing the wire to slide between the legs and into the bore of the wire mounting portion. Once the clips have been mounted to the wire, the clip legs are inserted into the frame aperture. This causes the barbs of the legs to collapse back against the legs, reducing the overall width of the legs allowing the legs to pass through the aperture. After the reverse portion of the legs have cleared the aperture, the barbs spread apart from the legs and engage the opposite surface of the frame to prevent withdrawal of the clip from the aperture.

In a preferred embodiment, the wire has a bend located adjacent to at least one clip to prevent longitudinal movement of the wire relative to the clip by sliding of the wire within the clip bore.

Further objects, features and advantages of the invention will become apparent from a consideration of the following description and the appended claims when taken in connection with the accompanying drawings.

BRIEF DESCRIPTION OF THE DRAWINGS

FIG. 3 is a perspective view of the attaching clip of the present invention;

FIG. 4 is an exploded elevational view showing the clip, wire and frame;

FIG. 5 is an elevational view showing the clip, wire and frame in an assembled condition.

DETAILED DESCRIPTION OF THE PREFERRED EMBODIMENT

Figure 1:
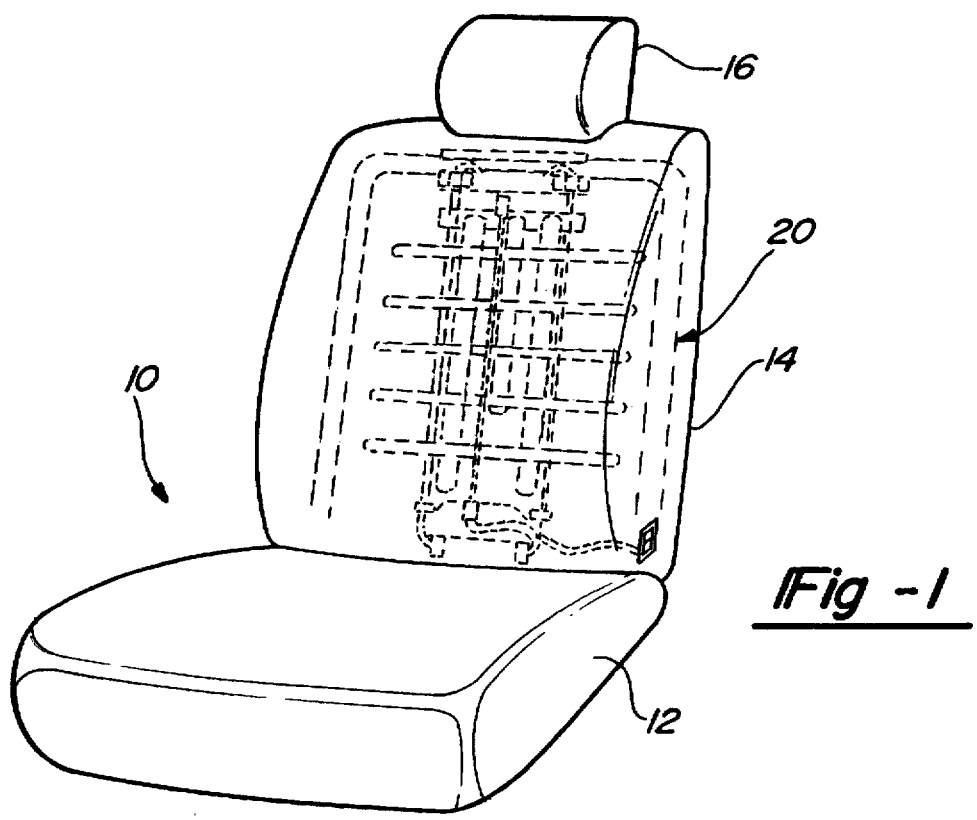
FIG. 1 is a perspective view of a seat assembly showing a seat back frame and a lumbar support device attached to the frame by the clips of the present invention.

With reference to FIG. 1, vehicle seat assembly 10 is shown which utilizes the wire attachment of the present invention for attaching components to a seat back frame. Seat assembly 10 includes a generally horizontal seat cushion 12 and an upright seat back 14 which extends upwardly from the seat cushion at the rear end thereof. A headrest 16 is positioned at the upper end of the seat back.

Figure 2:
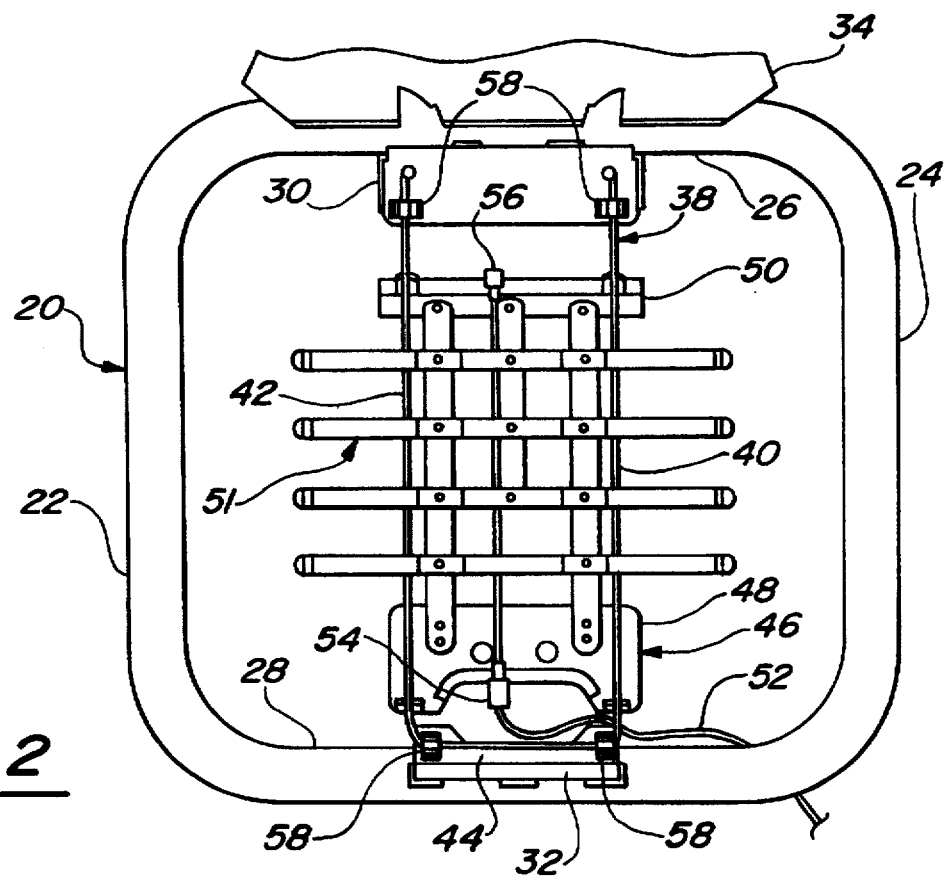
FIG. 2 is a front elevation view of the seat back frame and lumbar support device of FIG. 1.

The seat back 14 includes a frame 20 shown in FIG. 2. Seat back frame 20 is comprised of a pair of spaced upright frame members 22 and 24 as well as a upper and lower cross members 26 and 28. The upper cross member 26 has a flange 30 attached thereto by welds, bolts, rivets, etc. Likewise, the lower cross member has a flange 32 attached thereto. In the embodiment shown in FIG. 2, the seat back frame 20 is constructed from a tube which is bent to form the upright frame members and cross members. The present invention can be utilized with seat back frames constructed in other manners such as stamped metal, cast metal, extrusions, composites, plastics, fiberglass, etc. The particular structure of the seat back frame does not affect the wire attachment of the present invention.

The seat back frame 20 includes a headrest frame 34 extending upwardly from the upper cross member 26. Furthermore, the frame includes attaching brackets (not shown) at its lower end are used to attach the seat back frame to the lower seat frame in the cushion 12.

With reference to FIG. 2, a U-shaped wire 38 is attached to the frame 20 and includes a right vertical portion 40, a left vertical portion 42 and a lower horizontal portion 44. The wire 38 is attached to the seat back frame by the clips of the present invention as described below. The wire 38 is used to support an adjustable lumbar mechanism 46. The lumbar mechanism includes a stationary base plate 48 and an movable upper plate 50. The base plate and upper plates are coupled together by a flexible grid member 51. The lumbar mechanism is adjustable by varying the position of the movable upper plate 50 relative to the base plate 48. This is accomplished with the use of a pull cable 52. The housing of the cable 52 is attached to the base plate 48 by the connector 54. The cable extends from the connector 54 to the upper plate 50 where it is attached with a connector 56. By pulling on the cable, the moveable upper plate 50 is lowered by sliding along the left and right vertical portions 40 and 42 of the wire 38, this causes the flexible grid member 51 to bulge forward, changing the contour of the seat back in the lumbar region.

To enable the lumbar mechanism to provide the desired support, it is necessary that the wire 38 be firmly and durably attached to the seat back frame. This is accomplished by attaching clips 58 of the present invention.

The clip 58 is shown in greater detail in FIGS. 3, 4 and 5. The clip includes a wire mounting portion 60 which forms a bore 62 that receives and holds a portion of the length of the wire 38 as described below. The bore is cylindrical as shown but could have other shapes to match the cross-sectional shape of the wire. A pair of legs 64 and 66 extend from the wire mounting portion 60, generally radially relative to the axis of the bore 62. The legs 64 and 66 are slightly spaced from one another leaving a slot 68 therebetween. The slot 68 extends from the distal ends 70 of the two legs to the bore 62. At their distal ends, adjacent to the slot 68, the legs are formed with a chamfer 72. The angled surface to the chamfer guides the wire 38 into the slot 68. The wire is inserted into the slot causing the legs to spread apart from one another as the wire slides through the slot into the bore 62.

At the distal end 70 of each leg, a reverse bend is formed leading to a locking barb 74 that extends upwardly and outwardly from each leg. A retaining tab 76 extends from the end 75 of each barb 74. A spring finger 78 extends outwardly from each leg intermediate the wire mounting portion 60 and the ends of the barbs 74.

The wire 38 is mounted to the frame 20 as follows. At the desired location, the frame 20 is formed with an aperture 82. After the wire 38 has been inserted between the legs of the clip and into the bore 62, the distal ends of the legs 70 are inserted into the aperture 82. The width of the legs and barbs is greater than the width of the aperture 82 such that each barb is compressed toward its respective leg as the legs are pushed into the aperture. This enables the legs and barbs to be inserted through the aperture 82 until the ends 74 of the barbs pass through the aperture 82 to the opposite surface 86 of the frame member into which the clip is installed.

In order to fully insert the barbs through the aperture 82, it is necessary for the spring fingers 78 to be deflected by contact with the first surface 84 of the frame member. This results in the spring fingers applying a force pulling the barbs into firm engagement with the frame surface 86.

Once the barbs have passed entirely through the aperture 82, they are allowed to expand outward beyond the periphery of the aperture 82. The retaining tabs 76, however, limit the outward movement of the barbs. The tabs 76 prevent the barbs from being further separated by an upward force as viewed in FIG. 5 which could cause the barbs 74 to further spread and ultimately allow the clip 58 to be withdrawn from the aperture 82. The clip 58 thus secures the wire to the frame 20.

With reference again to FIG. 2, it is noted that the wire 38 is bent at its lower end adjacent to each of the two clips 58 attached to the lower cross member 28. The bends adjacent to the clips 58 prevent longitudinal movement of the wire 38 within the clip bores 62. The two lower clips 58 thus prevent horizontal movement of the wire 38 and also prevent vertical movement of the wire relative to the frame 20 since the axis of the lower clip bores are normal to the axis of the upper clip bores.

Figure 6:
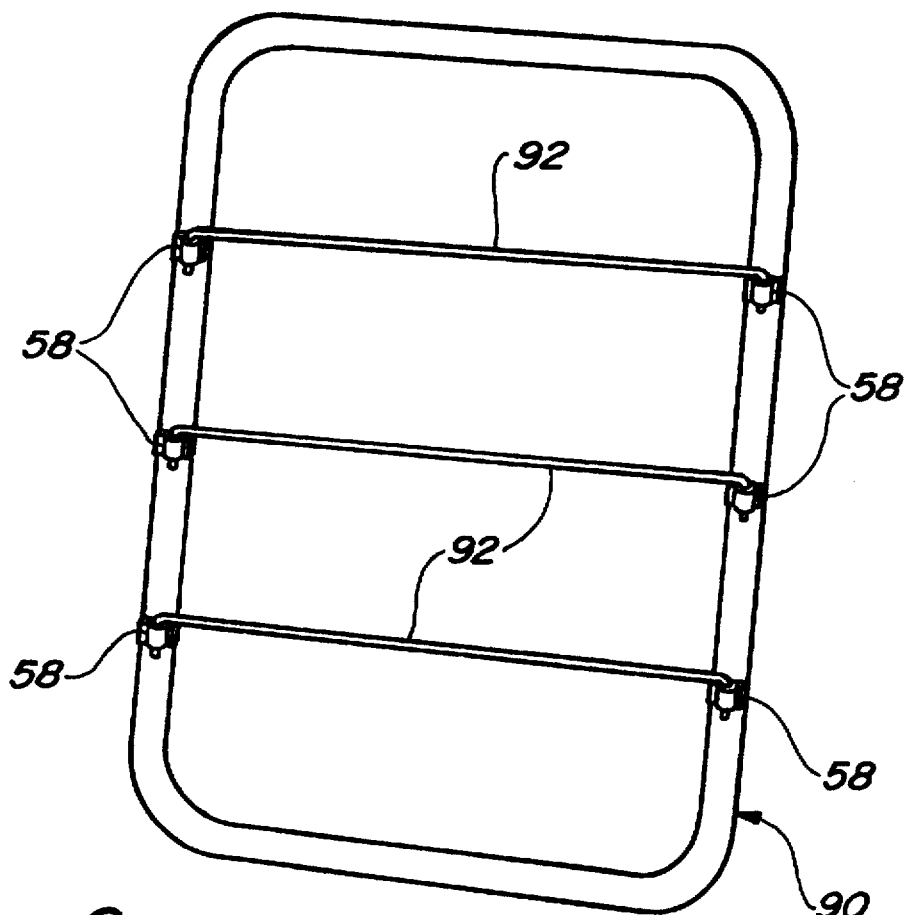
FIG. 6 is a perspective view of another seat back illustrating another embodiment of the seat back frame with the support wires used to support a resilient pad.

The clips 58 can be used to attach other support wires to the frame 20 beside the wire 38 used for the lumbar mechanism 46. For example, with reference to FIG. 6, a seat back frame 90 is shown which is similar in structure to the seat back 20 shown in FIG. 2. Three wires 92 extend across the frame between its two upright members and are attached to the upright members by clips 58. The wires 92 support a resilient pad such as a molded foam pad upon the seat back frame 90. Clips 58 can be used to attach any supporting wire to the seat back frame as well as to a seat cushion frame if desired. The clips can be attached to a flat plate portion of a frame as shown in FIG. 2 or they can be attached to a tubular portion of the frame through an aperture formed directly in the tube as shown in FIG. 6. It may be preferred, when attaching the clip directly to the tube to drill the aperture in the tube as opposed to punching to form a flat and consistent engagement surface for the barbs 74 to engage.

The wire attachment of the present invention provides for a weld free attachment of the support wires. This eliminates the difficulties associated with welding as well as the durability concerns. The clip is preferably molded of a plastic resin. A wide variety of resins may be used.

It is to be understood that the invention is not limited to the exact construction illustrated and described above, but that various changes and modifications may be made without departing from the spirit and scope of the invention as defined in the following claims.

We claim:

1. A vehicle seat back assembly comprising:
 a frame having at least two spaced apart frame members;
 a lumbar support device disposed between said spaced apart frame members, said lumbar support device having a wire extending between said spaced apart frame members; and
 a barbed clip having a wire mounting portion with a bore with a portion of said wire extending through said bore and said clip further having an attaching portion for attaching said clip to one of said frame members by insertion of said attaching portion into an aperture in said one frame member to fix said bore in position relative to said aperture in said frame member whereby said wire is attached to said one frame member.

2. The vehicle seat back assembly of claim 1 wherein said wire has a bend therein adjacent said clip to prevent longitudinal movement of said wire within said bore relative to said clip.

3. The vehicle seat back assembly of claim 1 wherein said spaced apart frame members are generally upright frame members.

4. The vehicle seat back assembly of claim 1 wherein said spaced apart frame members are generally horizontal cross members.

5. The vehicle seat back assembly of claim 1 wherein said frame members are hollow tubes with an aperture therein for reception of said attaching portion of said clip to attach said clip to said frame.

6. The component of claim 1 wherein said frame members are hollow tubes having a flange fixed thereto with an aperture in said flange for reception of said attaching portion of said clip to attach said clip to said frame.

7. The vehicle seat back assembly of claim 1 comprising two of said clips mounted to said frame with the longitudinal axis of the bores of the two clip wire mounting portions being oriented generally at right angles to one another.

8. The vehicle seat back assembly of claim 1 comprising a pair of said clips for attaching said wire to said frame with one clip of said pair being attached to each of said spaced apart frame members.

9. The vehicle seat back assembly of claim 8 wherein said wire has a bend therein adjacent each of said clips to prevent longitudinal movement of said wire within said bore relative to said clips.

10. The vehicle seat back assembly of claim 1 wherein said attaching portion of said clip includes a pair of generally parallel legs extending from said mounting portion, said legs being resiliently flexible relative to one another, said legs having a reverse bend at distal ends thereof forming a barb extending back toward said mounting portion and away from the associated leg, said barbs being flexible relative to said associated leg whereby said barbs can flex toward said legs, said legs and barbs being inserted into the aperture in said frame member by movement of the barbs toward one another after which said barbs spread apart to a width larger than said aperture to prevent withdrawal of the barbs from the aperture whereby said clip is attached to said frame member.

11. The vehicle seat back assembly of claim 10 wherein said clip is split between the legs from a distal end of said legs to said bore whereby the clip can be inserted onto the wire by pushing the wire between the legs to spread the legs and open the split therebetween allowing the wire to pass between the legs and into the bore.

12. The vehicle seat back assembly of claim 11 wherein said legs have a chamfer at the distal end thereof to guide movement of said wire between said legs.

13. The vehicle seat back assembly of claim 10 wherein said clip further comprises bias means adjacent said mounting portion for engaging a surface of said frame member adjacent said aperture and urging said legs in a direction to withdraw said legs from said aperture and draw said barbs into engagement with an opposite surface of said frame member adjacent said aperture therein.

14. The vehicle seat back assembly of claim 13 wherein said clip further comprises tabs extending from ends of said barbs into said aperture to prevent lateral movement of said barbs relative to said aperture.

15. A component assembly for a vehicle seat comprising:
a frame having at least two spaced apart frame members;
an elongated support wire extending between said spaced apart frame members and being attached thereto;
at least one barbed clip attaching said wire to said frame, said clip having a wire mounting portion with a bore through which a portion of said wire extends and an attaching portion for attaching said clip to one of said frame members by insertion of said attaching portion of said clip into an aperture in said one frame member whereby said wire is attached to said one frame member; and
a resilient pad at least partially supported upon said wire to mount said pad upon said frame.

16. An assembly comprising:
a frame having at least two spaced apart frame members;
an elongated support wire extending between said spaced apart frame members; and
a clip having a wire mounting portion with a bore for receiving a portion of said wire therethrough and an attaching portion for attaching said clip to one of said frame members by insertion of said attaching portion into an aperture in said one frame member whereby said wire, with a portion thereof disposed within said bore is attached to said one frame member, said attaching portion of said clip including a pair of generally parallel legs extending from said mounting portion, said legs being resiliently flexible relative to one another, said legs each having a reverse bend at distal ends thereof forming a barb extending back toward said mounting portion and away from the associated leg, said barbs being flexible relative to said associated leg whereby said barbs can flex toward said legs, said legs and barbs being inserted into the aperture in said frame member by movement of the barbs toward the associated legs after which said barbs spread apart to a width larger than said aperture to prevent withdrawal of the legs and barbs from the aperture whereby said clip is attached to said frame member.

17. The assembly of claim 16 wherein said clip is split between the legs from a distal end of said legs to said bore whereby the clip can be inserted onto the wire by pushing the wire between the legs to spread the legs and open the split therebetween allowing the wire to pass between the legs and into the bore.

18. The assembly of claim 17 wherein said legs have a chamfer at the distal end thereof to guide movement of said wire between said legs.

19. The assembly of claim 16 wherein said clip further comprises bias means adjacent said mounting portion for engaging a surface of said frame member adjacent said aperture and urging said legs in a direction to withdraw said legs from said aperture and draw said barbs into engagement with an opposite surface of said frame member adjacent said aperture therein.

20. The assembly of claim 19 wherein said clip further comprises tabs extending from ends of said barbs into said aperture to prevent lateral movement of said barbs relative to said aperture.

* * * * *